March 3, 1936.                J. S. FERGUSON                2,032,925
                PROCESS FOR REMOVING CARBONACEOUS IMPURITIES
                      FROM HYDROGEN AND OTHER GASES
                            Filed May 29, 1933

Inventor:
John S. Ferguson,
by Harry E. Dunham
His Attorney.

Patented Mar. 3, 1936

2,032,925

UNITED STATES PATENT OFFICE 2,032,925

PROCESS FOR REMOVING CARBONACEOUS IMPURITIES FROM HYDROGEN AND OTHER GASES

John S. Ferguson, Schenectady, N. Y., assignor to General Electric Company, a corporation of New York Application May 29, 1933, Serial No. 673,443

3 Claims. (Cl. 23—210)

The present invention has for its object the removal from gaseous mixtures of carbonaceous gases, such for example, as carbon monoxide, methane, ethane, or other hydrocarbons. My invention is applicable to the partial or complete removal of such carbonaceous gases from hydrogen, nitrogen, helium, and other non-carbonaceous gases.

In accordance with my invention such undesired gaseous carbon compounds are removed by chemically acting upon such a gaseous mixture with heated aluminum. In accordance with one mode of carrying out my invention the gaseous mixture is passed through a heated retort containing finely divided aluminum, the latter preferably being interspersed with a refractory material which is inert with respect to aluminum at high temperatures, aluminum silicate and aluminum oxide being an example of such material.

The production of technically pure hydrogen for industrial uses has been restricted heretofore to processes not easily installed on a small scale and which are more expensive than the production of gaseous mixture containing beside hydrogen also carbon monoxide, carbon dioxide, and hydrocarbons, such as methane.

By the practice of my invention such mixtures may have their content of carbonaceous gases reduced or such gases may be entirely removed, as desired, to produce hydrogen of required purity.

Figure 1:
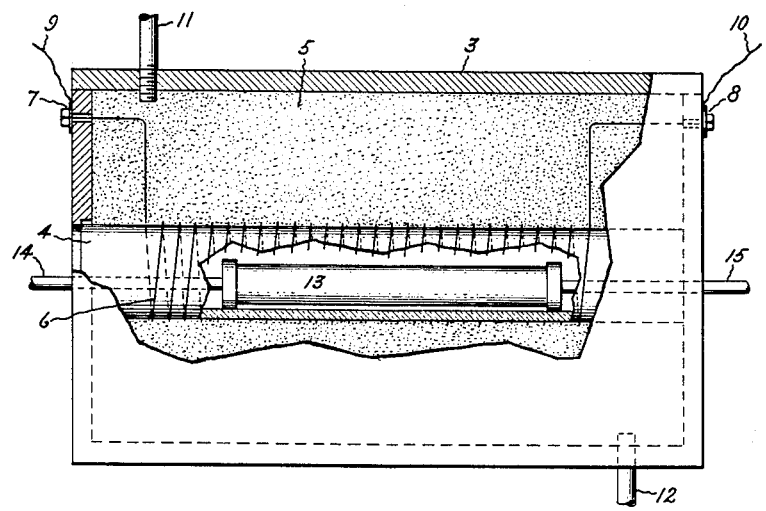
Figure 2:
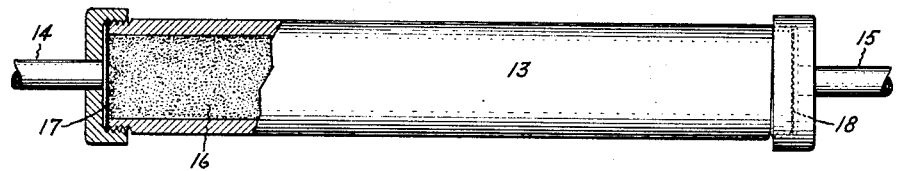

The accompanying drawing shows an apparatus suitable for carrying out my invention. Fig. 1 is a side elevation partly in section of an electric furnace containing such retort and Fig. 2 shows the retort on a larger scale and partly in section.

The apparatus illustrated comprises a housing 3 made of iron or the like containing a furnace chamber 4 of alundum or refractory ceramic material, the space between the housing 3 and the chamber 4 being filled with heat insulating material 5, such as finely divided silica, asbestos, or the like. Surrounding the chamber 4 is an electric heater 6 consisting of molybdenum or tungsten wire, the ends of which are connected to electric terminals 7, 8 to which are connected the electric supply conductors 9, 10. A protective gas such as hydrogen or nitrogen may be supplied by the pipes 11, 12 to prevent oxidation of the heater 6.

Within the furnace chamber is a retort 13 made of wrought iron or other suitable material which is connected at opposite ends respectively to pipes 14, 15. Within the retort is a charge 16 of aluminum powder the particles of which may be thoroughly dispersed in a refractory diluent as above indicated. Loss of the powdered charge is prevented by the screens 17, 18. The retort during the purifying process preferably should be heated to a temperature of about 700° C. to about 950° C. In some cases the retort may be operated to advantage in a vertical position.

When a gaseous mixture such for example, as ordinary "city gas" comprising hydrogen and gaseous carbon compounds, principally methane, ethane, butane, and higher hydrocarbons, as well as carbon monoxide and carbon dioxide are conducted through the charge 16, the carbon of such carbon compounds either becomes combined with the aluminum or is deposited as free carbon. The hydrogen content of the hydrocarbons is liberated and as it is added to the original hydrogen present, the volume of resultant gas is undiminished and may be increased.

I may by this process remove carbon compounds from various commercial gases, as for example from the gaseous product known as "Electrolene", described in a copending application Serial No. 433,725, filed March 6, 1930, by Frederick P. Wilson, Jr., Patent 1,953,047 issued March 27, 1934 (British Patent 371,108).

The aluminum mixture when spent may be reacted with water to form methane gas, aluminum oxide being formed as a by-product.

Although particular reference has been made to the removal of carbon-containing gas from hydrogen, my process may be used similarly for the purification of nitrogen, helium, or other gas which does not react chemically with aluminum.

What I claim as new and desire to secure by Letters Patent of the United States, is:

1. The method of removing carbonaceous gas from admixture with gases which are inert with respect to aluminum which consists in passing said mixture into contact with dispersed aluminum particles at a temperature of at least 700° C.

2. The method of obtaining pure hydrogen from a carbonaceous mixture which consists in conducting such a mixture into contact with a reaction material comprising as a substantial ingredient thereof dispersed aluminum particles, and maintaining said reaction material at a temperature of at least about 700° C.

3. The method of purifying hydrogen containing gaseous carbonaceous impurities which consists in causing said impurities to react at a temperature of at least about 700° C. with a reaction mixture consisting essentially of aluminum thoroughly interspersed with a refractory diluent.

JOHN S. FERGUSON.